(12) United States Patent
Ikeda et al.

(10) Patent No.: US 9,864,480 B2
(45) Date of Patent: Jan. 9, 2018

(54) IMAGE FORMING APPARATUS, CONTROL METHOD THEREFOR, AND STORAGE MEDIUM STORING CONTROL PROGRAM THEREFOR

(75) Inventors: Toru Ikeda, Kawasaki (JP); Tomoya Sato, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 28 days.

(21) Appl. No.: 13/598,860

(22) Filed: Aug. 30, 2012

(65) Prior Publication Data

US 2013/0061149 A1 Mar. 7, 2013

(30) Foreign Application Priority Data

Sep. 1, 2011 (JP) ................. 2011-190621

(51) Int. Cl.
*G06F 3/048* (2013.01)
*G06F 3/0481* (2013.01)

(52) U.S. Cl.
CPC ................. *G06F 3/04817* (2013.01)

(58) Field of Classification Search
CPC ............. G06F 3/048; G06F 8/34; G06F 21/36
USPC .................................. 715/738, 788
See application file for complete search history.

(56) References Cited

U.S. PATENT DOCUMENTS

| 5,963,964 A * | 10/1999 | Nielsen | 715/255 |
| 6,300,870 B1 * | 10/2001 | Nelson | B60Q 1/503 340/463 |
| 6,714,974 B1 * | 3/2004 | Machida | H04L 41/22 709/204 |
| 7,216,304 B1 * | 5/2007 | Gourdol | G06F 9/4443 715/744 |
| 7,992,103 B2 * | 8/2011 | Gusmorino | G06F 3/04817 715/763 |
| 8,370,320 B1 * | 2/2013 | Fearnow | 707/706 |

(Continued)

FOREIGN PATENT DOCUMENTS

| JP | H11-110100 A | 4/1999 |
| JP | 2005064817 A | 3/2005 |

(Continued)

OTHER PUBLICATIONS

"IE5" Microsoft Corp,Customize icons displayed in Favorites Mar. 16, 2004, Rev2.0, Mar. 16, 2004 Cited in Japanese Office Action issued in counterpart application No. JP2011190621, dated Jul. 7, 2015. https://support.microsoft.com/ja-jp/kb/415022/ja.

(Continued)

*Primary Examiner* — Jeffrey A Gaffin
*Assistant Examiner* — Mohamed Abou El Seoud
(74) *Attorney, Agent, or Firm* — Rossi, Kimms & McDowell LLP (57) ABSTRACT

An image processing apparatus that is capable of displaying a WEB top button without deteriorating the quality of appearance even if the display size of the WEB top button is changed. A display unit displays a button, to which a URL is assigned, on an operation screen. An acquisition unit accesses a Web server that is identified by the URL and to acquire a plurality of icons in different sizes. The display unit selects an icon, which corresponds to a display size of the button, from among the icons acquired by the acquisition unit, and displays the selected icon together with the button.

10 Claims, 8 Drawing Sheets

(56) References Cited

U.S. PATENT DOCUMENTS

| | | | |
|---|---|---|---|
| 8,429,562 B2 * | 4/2013 | Gourdol | G06F 9/4443 715/765 |
| 8,482,808 B2 * | 7/2013 | Shigehisa | H04N 1/40062 358/403 |
| 2002/0085003 A1 * | 7/2002 | Nagashima | G06T 11/001 345/441 |
| 2003/0061283 A1 * | 3/2003 | Dutta | G06F 17/3089 709/204 |
| 2003/0135820 A1 * | 7/2003 | Aasman | 715/500 |
| 2004/0088377 A1 * | 5/2004 | Henriquez | H04L 69/329 709/219 |
| 2004/0090470 A1 * | 5/2004 | Kim | G06F 3/0481 715/846 |
| 2004/0266396 A1 * | 12/2004 | Henry | G06F 3/04817 455/412.1 |
| 2005/0037815 A1 * | 2/2005 | Besharat | G09G 5/02 455/566 |
| 2005/0240878 A1 * | 10/2005 | Anthony | G06F 3/04817 715/765 |
| 2005/0251758 A1 * | 11/2005 | Cummins | G06F 9/4443 715/838 |
| 2006/0184900 A1 * | 8/2006 | Ishii | H04N 5/23216 715/835 |
| 2007/0106987 A1 * | 5/2007 | Makino | G06F 9/4881 718/100 |
| 2007/0171093 A1 * | 7/2007 | Jang | G08G 1/096716 340/936 |
| 2007/0171471 A1 * | 7/2007 | Grosso | H04N 1/00132 358/1.15 |
| 2007/0256003 A1 * | 11/2007 | Wagoner et al. | 715/501.1 |
| 2008/0150952 A1 | 6/2008 | Koarai | |
| 2009/0180004 A1 * | 7/2009 | Shioda | H04N 5/23219 348/231.2 |
| 2009/0327853 A1 * | 12/2009 | Dean | G06F 3/048 715/221 |
| 2010/0146449 A1 * | 6/2010 | Brown et al. | 715/835 |
| 2010/0179991 A1 * | 7/2010 | Lorch et al. | 709/206 |
| 2010/0251146 A1 * | 9/2010 | Williams | 715/764 |
| 2011/0145688 A1 * | 6/2011 | Han | H04M 1/72561 715/206 |

FOREIGN PATENT DOCUMENTS

| | | | |
|---|---|---|---|
| JP | 2007128370 A | | 5/2007 |
| JP | 2008139981 A | | 6/2008 |
| JP | 2008217704 A | * | 9/2008 |
| JP | 2011123897 A | | 6/2011 |
| JP | 2012216136 A | * | 11/2012 |

OTHER PUBLICATIONS

Hornick "Icons", Microsoft Corporation, Sep. 29, 1995 Cited in Japanese Office Action issued in counterpart application No. JP2011190621, dated Jul. 7, 2015. http://web.archive.org/web/20110728211953/http://msdn.microsoft.com/en-us/library/ms997538%28printer%29.aspx.

Japanese Office Action issued in Japanese counterpart application No. JP2011-190621, dated Jul. 7, 2015.

* cited by examiner

```
<html>
<head>
<title>service server</title>
<link rel="shortcut icon"href="http://service_server/favicon_S.ico">
<link rel="shortcut icon"href="http://service_server/favicon_M.ico">
<link rel="shortcut icon"href="http://service_server/favicon_L.ico">
</head>
<body>
...
</body>
</html>
```

FIG. 6B

```
<html>
<head>
<title>service server</title>
<link rel="shortcut icon"size="S" href="http://service_server/favicon_1.ico">
<link rel="shortcut icon"size="M" href="http://service_server/favicon_2.ico">
<link rel="shortcut icon"size="L" href="http://service_server/favicon_3.ico">
</head>
<body>
...
</body>
</html>
```

IMAGE FORMING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus, a control method therefor, and a storage medium storing control program therefor. Particularly, the present invention relates to a technique for controlling a screen display that can be displayed on an operation unit by a WEB browser incorporating a WEB application.

Description of the Related Art

Conventionally, there is an image processing apparatus that is connected to an external WEB server on a network and uses a service supplied by the external WEB server. For example, Japanese Laid-Open Patent Publication (Kokai) No. 2007-128370 (JP 2007-128370A) discloses an image processing apparatus that transmits image data, which is generated by reading an image on an original, to a document server on a network and registers it to a document database of the document server by means of cooperation of a WEB browser of the image processing apparatus and an external WEB server.

In such an image processing apparatus using an external WEB server, a shortcut button (a WEB top button) of the WEB browser that is associated with a URL address of the external WEB server can be registered. Selection of the WEB top button displays the WEB browser on an operation screen. The WEB browser accesses the external WEB server of which the URL is registered to the WEB top button, and displays WEB screen contents thereof.

The WEB top button is usually displayed as a button with an icon. When the WEB top button is registered as the shortcut of the WEB browser, the icon of the WEB browser application is usually displayed as the WEB top button. In this case, even if different URL addresses are registered to a plurality of WEB top buttons, respectively, the same type icons are displayed for all the buttons in general.

On the other hand, an information processing apparatus (a personal computer (PC) etc.) usually displays an icon acquired from the WEB server on a WEB top button. Since such an information processing apparatus displays different icons, which are acquired from the WEB servers, on WEB top buttons for the respective WEB servers, a user easily distinguishes a desired WEB top button from the other buttons.

In an information processing apparatus, when the display size of the WEB top buttons is changed, the number of the buttons displayed on a screen may fluctuate. For example, when the display size of the WEB top buttons becomes small, the number of the buttons displayed on the screen increases.

However, when a WEB server has an icon of only one size, the information processing apparatus cannot change the display size of a WEB top button to an appropriate size using an icon acquired from the WEB server. Or even if the display size can be changed, the information processing apparatus has a problem that the quality of appearance deteriorates because the resolution of the displayed icon becomes lower as the scale of enlargement increases.

SUMMARY OF THE INVENTION

The present invention provides an image processing apparatus, a control method therefor, and a storage medium storing a control program therefor, which are capable of displaying a WEB top button without deteriorating the quality of appearance even if the display size of the WEB top button is changed.

Accordingly, a first aspect of the present invention provides an image processing apparatus comprising a display unit configured to display a button, to which a URL is assigned, on an operation screen, and an acquisition unit configured to access a Web server that is identified by the URL and to acquire a plurality of icons in different sizes, wherein the display unit selects an icon, which corresponds to a display size of the button, from among the icons acquired by the acquisition unit, and display the selected icon together with the button.

Accordingly, a second aspect of the present invention provides a control method for an image processing apparatus comprising a display step of displaying a button, to which a URL is assigned, on an operation screen, and an acquisition step of accessing a Web server that is identified by the URL and acquiring a plurality of icons in different sizes, wherein an icon, which corresponds to a display size of the button, is selected from among the icons acquired in the acquisition step, and the selected icon is displayed together with the button in the display step.

Accordingly, a third aspect of the present invention provides a non-transitory computer-readable storage medium storing a control program causing a computer to execute the control method of the second aspect.

According to the present invention, icons of a plurality of sizes can be acquired from the WEB server, and a WEB top button can be displayed using the icon of the suitable display size. Thereby, the display size of the WEB top button can be changed without deteriorating the quality of appearance as much as possible.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
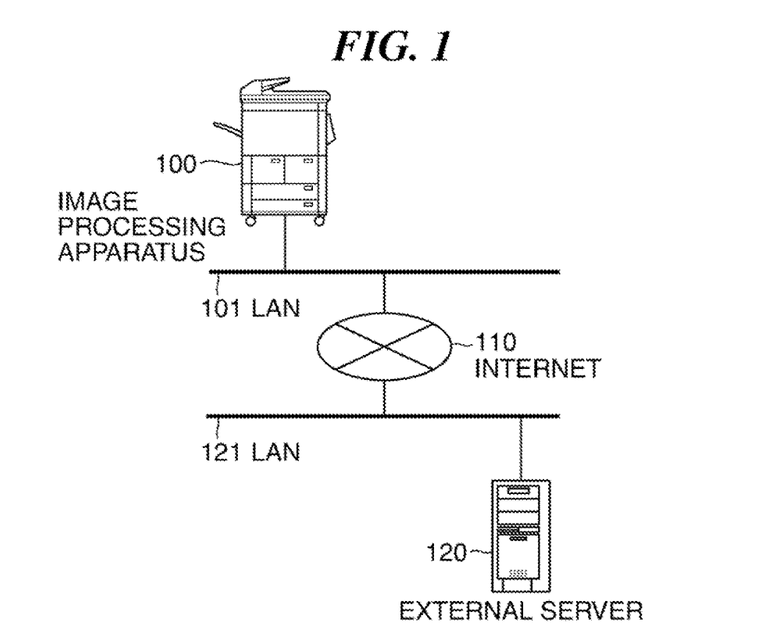
FIG. 1 is a general view showing an image processing system according to an embodiment of the present invention.

FIG. 1 is a general view of an image processing system. An image processing apparatus 100 is connected to the Internet 110 through a LAN 101. Moreover, an external server 120 (a WWW server) that provides service under a cloud computing environment is connected to the Internet 110 through a LAN 121.

In the image processing system constituted in this way, the image processing apparatus 100 can use the service provided by the external server 120 by communicating with the external server 120. It should be noted that the image processing system in FIG. 1 shows an example where the external server 120 provides a file management server. However, the image processing system may be equipped with a plurality of servers as another form of the external server 120, and may start a plurality of virtual machines in the server group in order to perform a distributed process.

Next, the configuration of the image processing apparatus according to the embodiment of the present invention will be described with reference to the block diagram in FIG. 2 that shows the hardware configuration of the image processing apparatus.

Figure 2:
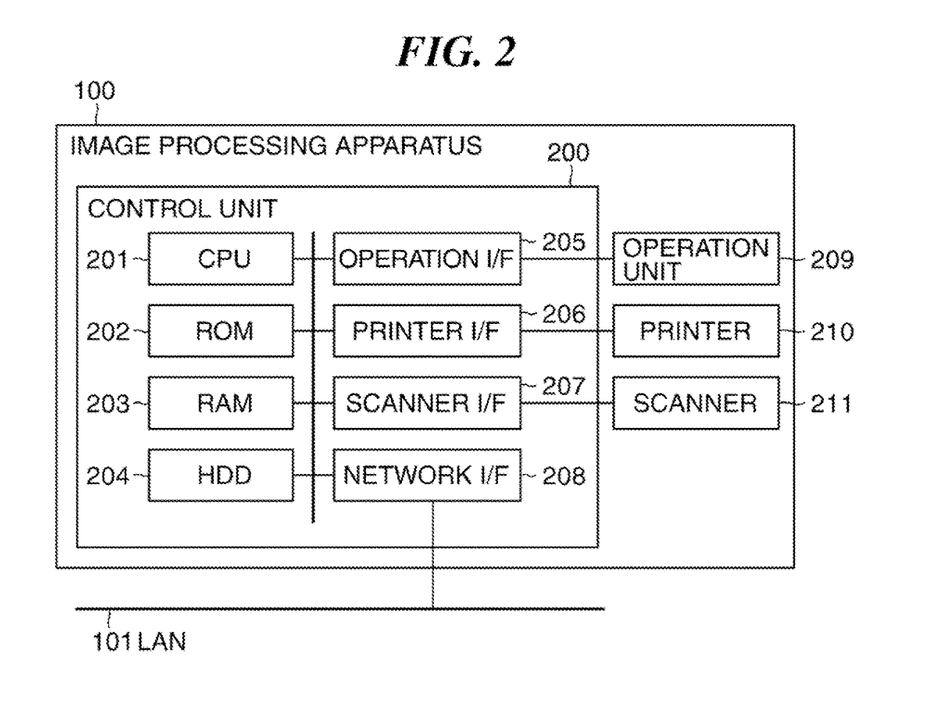
FIG. 2 is a block diagram schematically showing an essential part of an image forming apparatus according to the embodiment.

As shown in FIG. 2, the image processing apparatus 100 is provided with a control unit 200 containing a CPU 201. The control unit 200 controls a general operation of the image processing apparatus 100. The CPU 201 reads a control program stored in a ROM 202, and performs various controls like a reading control, a transmission control, etc.

A RAM 203 shown in FIG. 2 is used as a main memory of the CPU 201 and as temporary storage like a work area. An HDD 204 stores image data, various programs, and various information tables. An operation I/F (interface) 205 connects an operation unit 209 with the control unit 200. The operation unit 209 is provided with a liquid-crystal-display section having a touch-panel function, a keyboard, etc.

A printer I/F 206 shown in FIG. 2 connects a printer 210 with the control unit 200. Image data that should be printed by the printer 210 is transferred from the control unit 200 through the printer I/F 206, and is printed on a recording sheet in the printer 210. A scanner I/F 207 connects a scanner 211 with the control unit 200. The scanner 211 reads an image on an original, generates image data, and inputs it into the control unit 200 through the scanner I/F 207.

A network I/F 208 shown in FIG. 2 connects the control unit 200 to the LAN 101. Image data and information is transmitted to external apparatuses on the LAN 101 through the network I/F 208. And various kinds of information are received from the external apparatuses on the LAN 101 through the network I/F 208.

Next, the outline configuration of the external server that provides the external service concerning the embodiment will be described with reference to the block diagram in FIG. 3.

Figure 3:
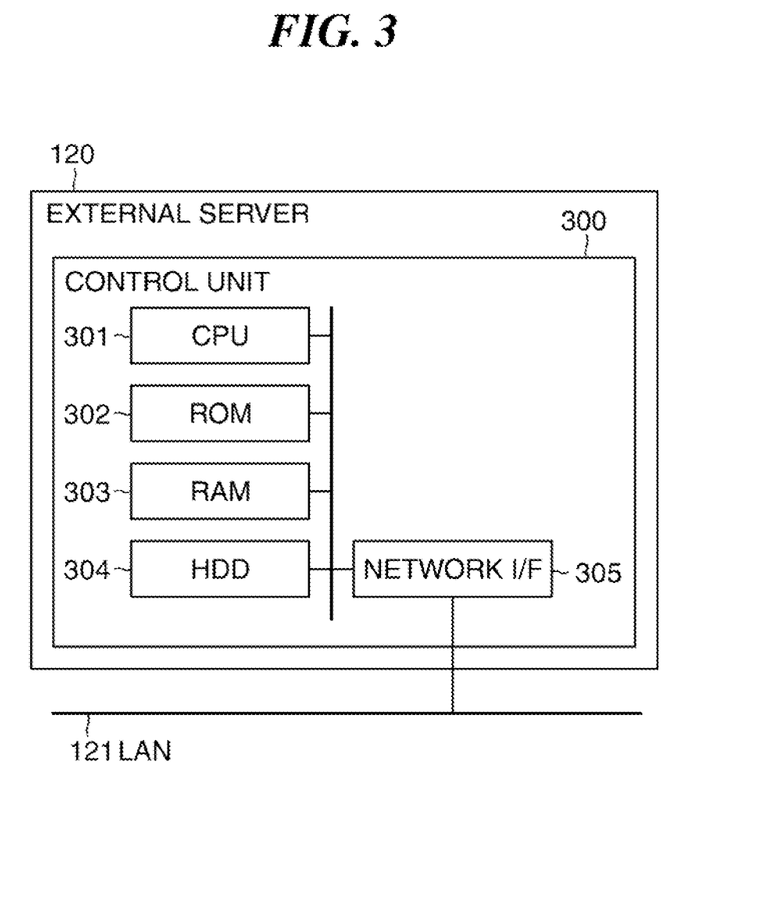
FIG. 3 is a block diagram schematically showing an essential part of an external server according to the embodiment.

A general operation in the external server 120 shown in FIG. 3 is controlled by a control unit 300 that contains a CPU 301. The CPU 301 reads a control program stored in a ROM 302, and performs various control processes. A RAM 303 shown in FIG. 3 is used as a main memory of the CPU 301 and as temporary storage like a work area. An HDD 304 stores image data, various programs, and icon data described later.

A network I/F 305 shown in FIG. 3 connects the control unit 300 to the LAN 121. The network I/F 305 is constituted so as to exchange various kinds of information with other apparatuses on the LAN 121.

Next, a software configuration of the entire system including the image processing apparatus and the external server will be described with reference to a block diagram in FIG. 4.

Figure 4:
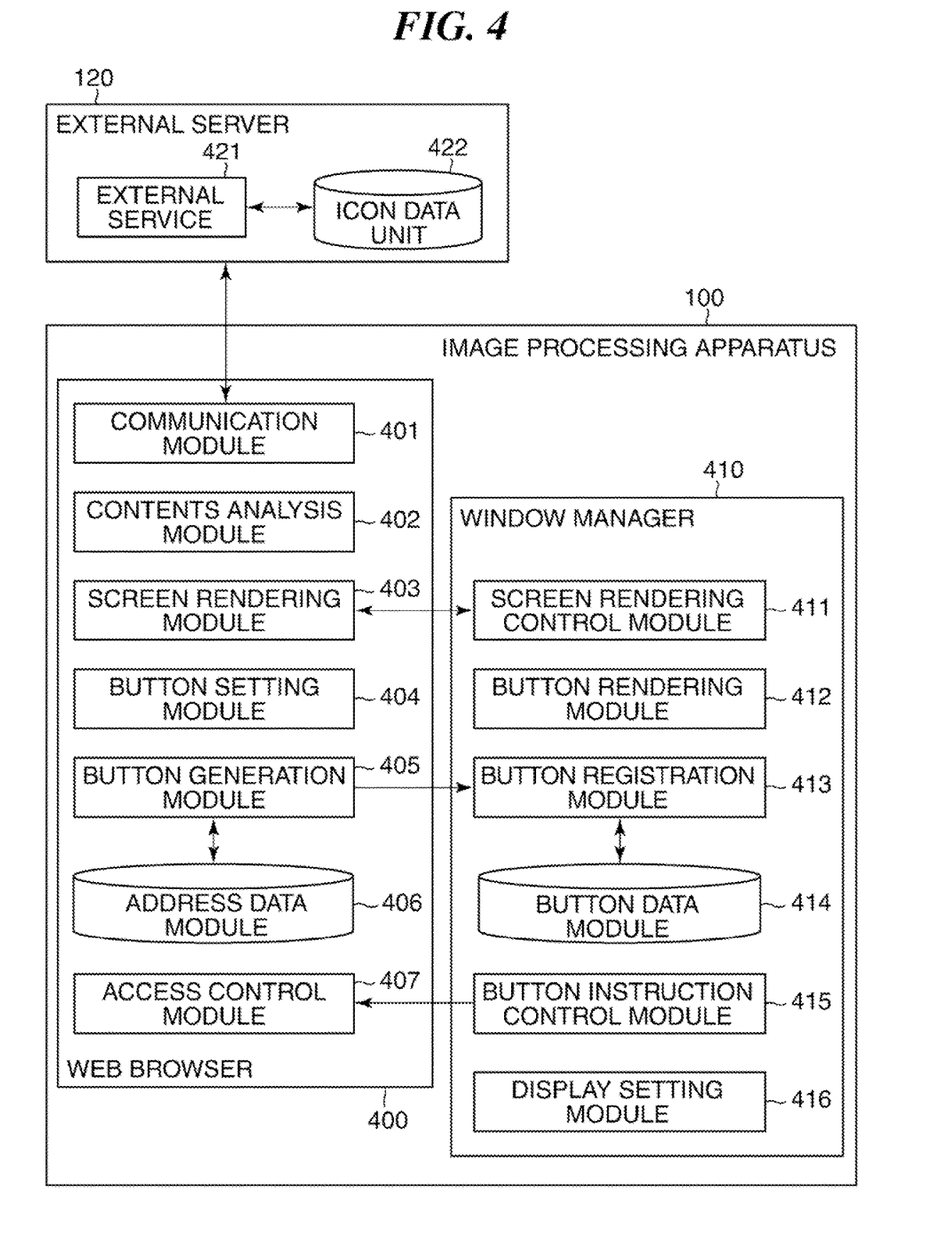
FIG. 4 is a block diagram schematically showing a software configuration of the image processing apparatus in the image processing system according to the embodiment.

In the image processing apparatus 100 shown in FIG. 4, the built-in CPU 201 executes various processes by reading and executing the control program stored in the ROM 202 or the HDD 204. In the external server 120, the built-in CPU 301 executes various processes by reading and executing the control program stored in the ROM 303 or the HDD 304.

The image processing apparatus 100 shown in FIG. 4 has functions of a WEB browser 400 and a window manager 410. The WEB browser 400 has a function to communicate with the external server 120 and to display screen information received from the external server 120 in response to a request onto the operation unit 209. The WEB browser 400 transmits a request to the external server 120 according to a user's instruction inputted through the operation unit 209. The WEB browser 400 is provided with a communication module 401 (an icon acquisition unit), a contents analysis module 402, a screen rendering module 403, and a button setting module 404. Furthermore, the WEB browser 400 is provided with a button generation module 405, an address data module 406 (a URL-information holding unit), and an access control module 407.

The communication module 401 communicates with the external server 120 in order to use external service 421 of the external server 120. Specifically, the communication module 401 transmits a request acquiring contents to the external service 421 and receives a response transmitted from the external server 120 as contents. The communication module 401 requests an icon from the external service 421 and receives the icon transmitted.

The contents analysis module 402 shown in FIG. 4 analyzes the contents that are acquired by the communication module 401, and generates a screen for displaying on the operation unit 209. The screen rendering module 403 displays the screen that is generated by the contents analysis module 402 onto the operation unit 209. In fact, the screen is displayed onto the operation unit 209 when a screen rendering control module 411 of the window manager 410 issues a rendering instruction.

The button setting module 404 shown in FIG. 4 requests the button generation module 405 to generate a button for displaying the external service 421 on the operation unit 209. At this time, the button setting module 404 designates a title displayed on the button, an access URL (URL information) of the external service 421 assigned to the button concerned.

The button generation module 405 shown in FIG. 4 requests the window manager 410 to register the display button for using the external service 421. The button generation module 405 receives the ID of the button registered in response to the request from the window manager 410, and saves it in relation to the address of the external service 421 into the address data module 406 (a URL-information holding unit). Moreover, the button generation module 405 saves the icon received by the communication module 401 in relation to the address of the external service 421 into the address data module 406. The address data module 406 (the URL-information holding unit) is set in the RAM 203 or the HDD 204.

The access control module 407 shown in FIG. 4 receives a notice from the window manager 410, when a user selects the button registered by the button generation module 405.

When receiving the notice, the access control module 407 reads the external service 421 related to the ID of the registered button received with the notice from the address data module 406, and instructs the communication module 401 to request.

The window manager 410 shown in FIG. 4 is provided with the screen rendering control module 411, a button rendering module 412 (a URL button display unit), and a button registration module 413 (a URL button registration unit). Furthermore, the window manager 410 is provided with a button data module 414, a button instruction control module 415, and a display setting module 416 (a button size setting unit).

The screen rendering control module 411 changes the screen displayed on the operation unit 209 to the application registered in relation to the selected button in response to the instruction from the button instruction control module 415. Specifically, the screen rendering control module 411 requests the application registered in relation to the selected button to render.

The button rendering module 412 shown in FIG. 4 renders the button registered to the button display screen displayed by the window manager 410. Moreover, the button rendering module 412 acquires the size value set by the display setting module 416 (the button size setting unit), and renders the button in the size designated by the size value.

The button registration module 413 (the URL button registration unit) shown in FIG. 4 accepts the request from the button generation module 405, and registers the display button for the external service 421 using the WEB browser 400. In this case, the button registration module 413 issues the ID of the registered button, and notifies it to the button generation module 405. The type and the registered ID of the application assigned to the button are linked to each other and are saved into the button data module 414.

The button data module 414 shown in FIG. 4 is set in the RAM 203 or the HDD 204. When the user's instruction inputted from the operation unit 209 is an instruction for selecting the registered button, the button instruction control unit 415 notifies the instruction to the application assigned to the selected button. When the user selects the registration button for the external service 421, the button instruction control module 415 notifies the registration ID of the registering button selected to the access control module 407.

The display setting module 416 shown in FIG. 4 sets the size of the button to display, and saves the set size value into the RAM 203. The size values are shown by characters, such as "S" and "M". Furthermore, the size values may be shown by character strings like "small" and "medium", or numbers like "1" and "2".

The external server 120 shown in FIG. 4 has the external service 421 and the icon data unit 422. The external service 421 receives a request message from the communication module 401, and transmits a response message for providing the service thereof to the communication module 401.

Moreover, when receiving a request for an icon from the communication module 401, the external service 421 of the external server 120 acquires the icon from the icon data unit 422, and transmits the icon to the communication module 401. The icon data unit 422 is set in the RAM 203 or the HDD 204. It should be noted that a button with a mechanism that the WEB browser 400 requests a screen from the external service 421 and displays when it is selected is called a WEB top button for the convenience of description.

Figure 5:
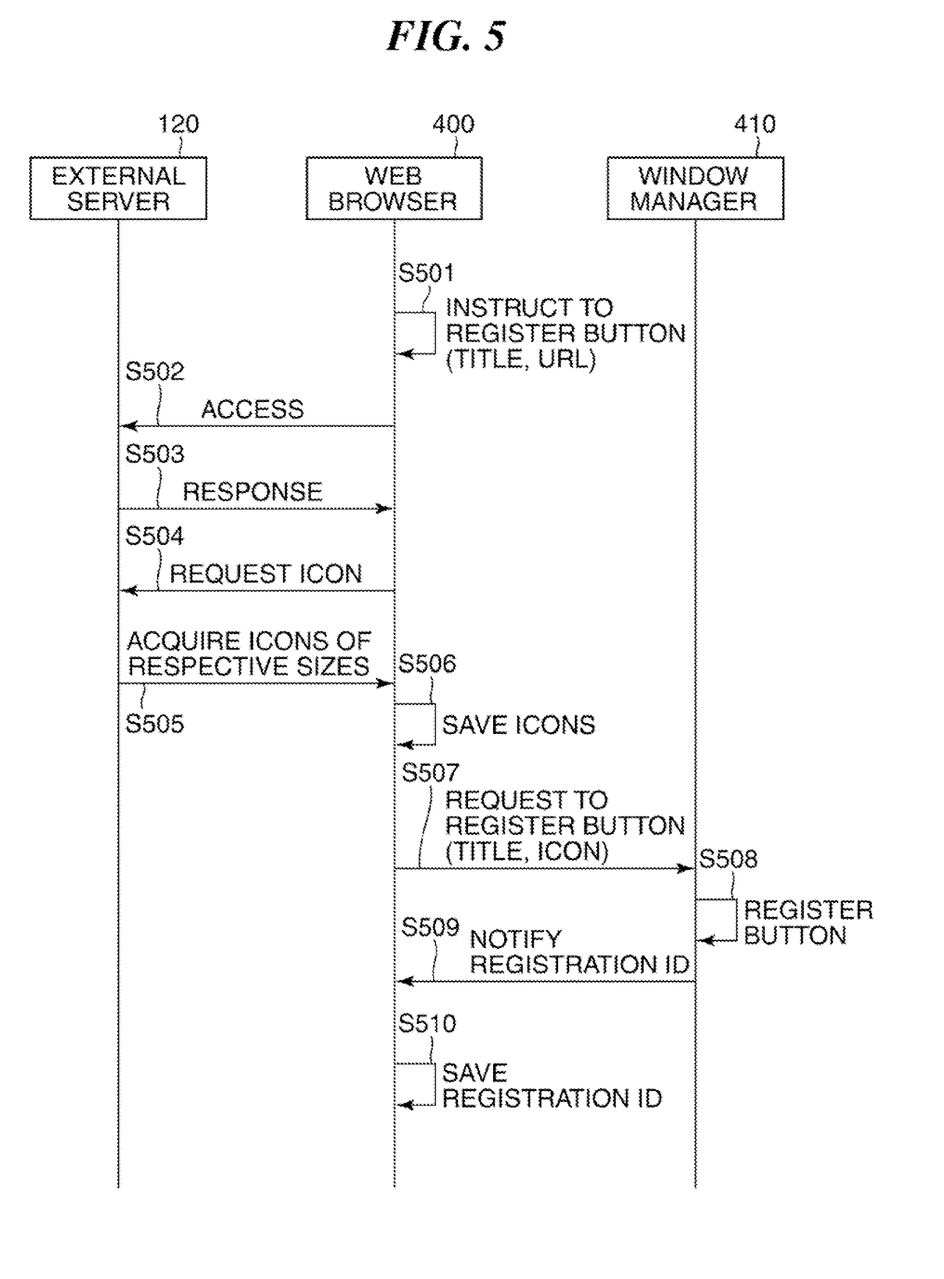
FIG. 5 is a timing chart showing an operation of the image processing system according to the embodiment.

Next, a series of processes for changing an icon of a WEB top button will be described with reference to the timing chart in FIG. 5. Each operation in the icon change process is achieved by executing a control program by the CPU 201 in the image processing apparatus 100. Or each operation in the icon change process is achieved by executing a control program by the CPU 301 in the external server 120.

The button setting module 404 of the WEB browser 400 requests registration from the button generation module 405 (step S501). At this time, the button setting module 404 designates a title displayed on the button and an access URL (URL information) of the external service 421.

Next, the WEB browser 400 accesses the external server 120 based on the designated access URL (step S502). The communication module 401 of the WEB browser 400 transmits the request of GET to the designated URL address.

Next, the external service 421 of the external server 120 transmits a response message to the communication module 401 of the WEB browser 400 (step S503). At this time, the external service 421 enters icon position information, which is included in the external server 120, in the response message. The icon position information is entered in a description format that has been beforehand decided between the image processing apparatus 100 and the external server 120, or in the description format of "Favicon (Favorite icon)" in HTML/XHTML.

Figure 6A:
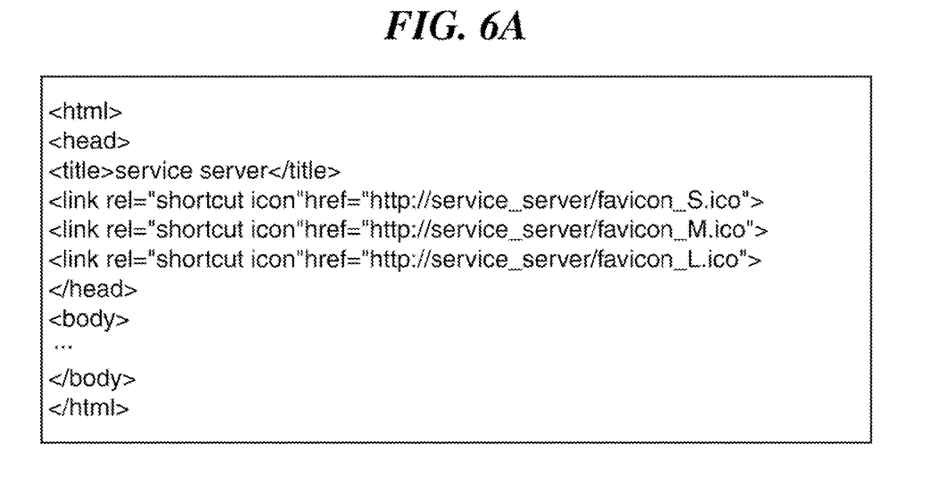
FIG. 6A and FIG. 6B are views showing description examples of Favicon in the embodiment, respectively.
Figure 6B:
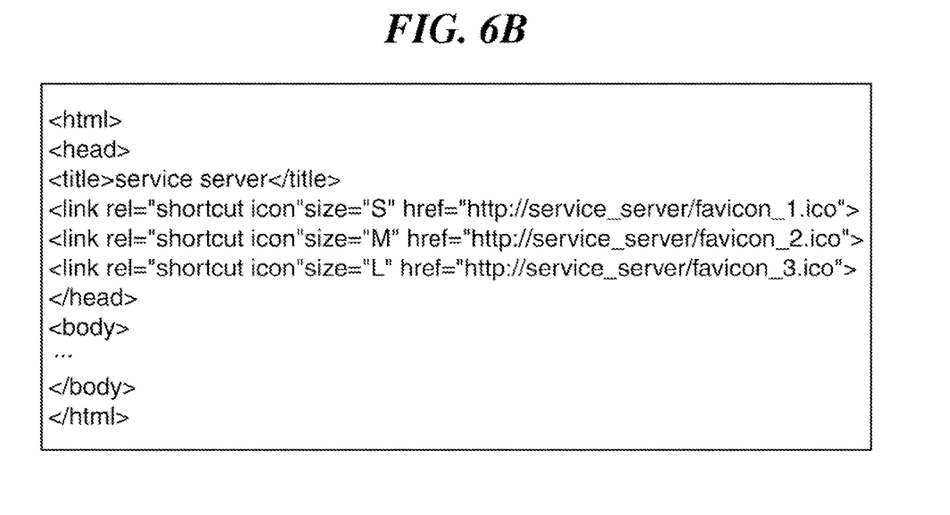

The external server 120 enters the positions of the icons in different sizes in order to display the suitable icon for the display size even if the display size of the WEB top button is changed. For example, a designation of the icon according to the description format of "Favicon" is shown in FIG. 6A. At this time, the information showing the icon size may be added to the designated filenames as shown by "http://service_server/favicon_S.ico" and "http://service_server/favicon_M.ico" in the description example in FIG. 6A. Furthermore, the icon size can be identified by describing attribution, such as size="S" and size="M", as shown in FIG. 6B.

Next, the communication module 401 of the WEB browser 400 requests to acquire icons from the addresses of the icon positions of the respective sizes acquired in the step S503 (step S504). Since the icons are held by the icon data unit 422 of the external server 120, the communication module 401 requests GET from the external server 120. Next, the external service 421 of the external server 120 transmits the icons of the respective sizes requested to the communication module 401 of the WEB browser 400 (step S505).

Next, the button generation module 405 of the WEB browser 400 saves the icons of the respective sizes acquired in the step S505 in the HDD 204, and saves the position information about the saved icons in the address data module 406 (step S506). At this time, the button generation module 405 also saves the information showing the icon sizes in relation to the position information.

Next, the button generation module 405 of the WEB browser 400 requests to register a button to the button registration module 413 of the window manager 410 based on the button registration request in the step S501 (step S507). At this time, the button generation module 405 designates the title received in the step S501 and the saving positions of the position information about the icons of the respective sizes in the icon data unit 422 to the button registration module 413.

Next, the button registration module 413 of the window manager 410 registers the button that received the request in the step S507 (step S508). The button registration module 413 generates an ID of the registered button, and saves it to the button data module 414 in relation to the type of the external service that received the registration request, the title, and the position information of the icon data unit. Furthermore, the button rendering module 412 of the window manager 410 displays the button that has been registered on a screen. At this time, the button rendering module 412 compares the display size of the WEB top button set by the display setting module 416 and the icon size saved in the step S506. When there is the icon of the same size, the button rendering module 412 displays the icon of the size on the screen.

Next, the button registration module 413 of the window manager 410 notifies the registration ID generated in the step S508 to the button generation module 405 of the WEB browser 400 (step S509). Next, the button generation module 405 of the WEB browser 400 saves the registration ID of the button received from the button registration module 413 together with the access URL of the external service 421 in the address data module 406 (step S510).

Figure 7:
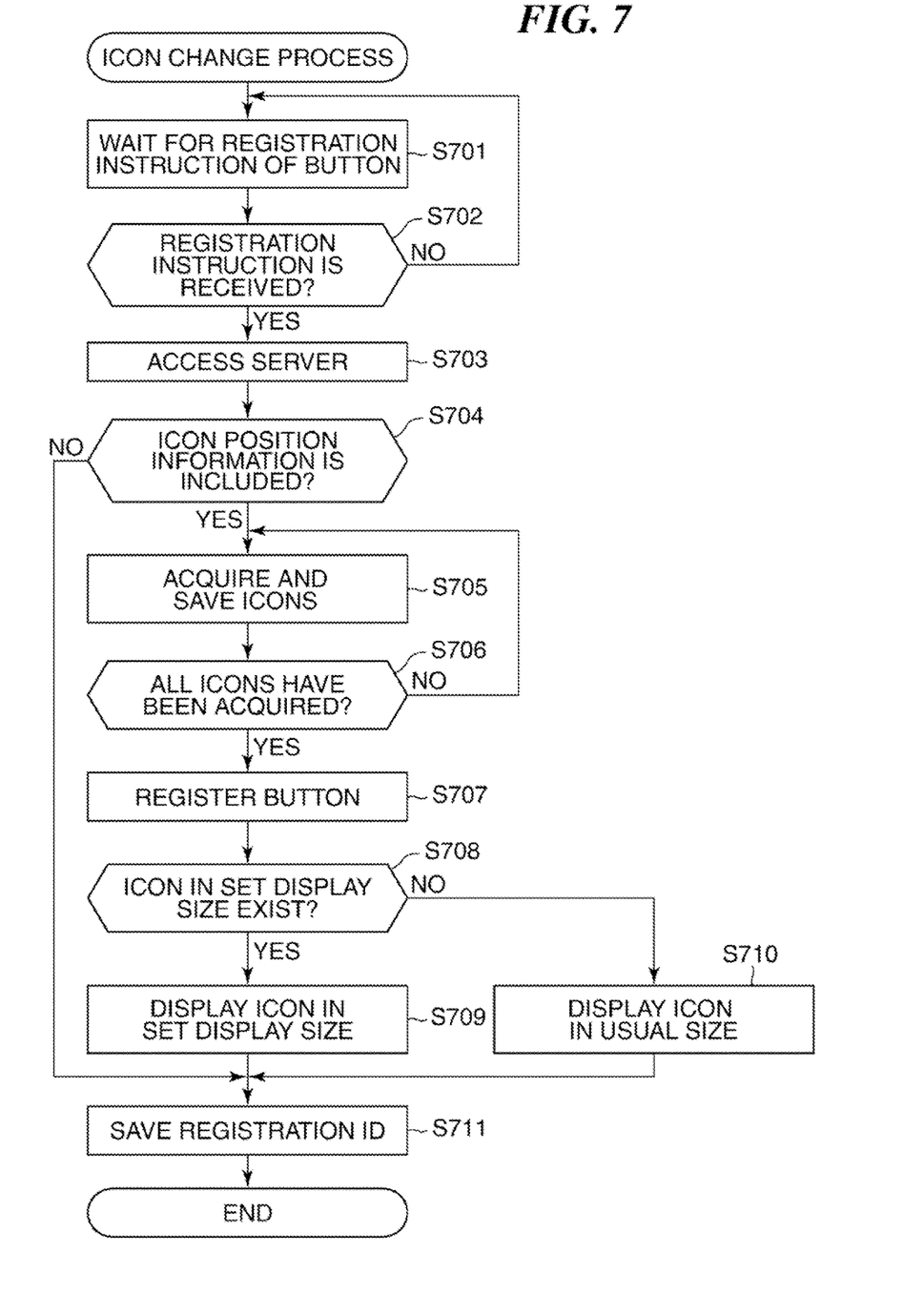
FIG. 7 is a flowchart showing an icon change process executed by the image processing system according to the embodiment.

Next, a series of processes for changing an icon registered according to a display size at the time to register the WEB top button in this system will be described with reference to the flowchart in FIG. 7. Each operation in the icon change process shown in the flowchart in FIG. 7 is achieved by executing a control program by the CPU 201 in the image processing apparatus 100.

The icon change process starts by turning on the power of the image processing apparatus 100. When the icon change process starts, the button generation module 405 of the WEB browser 400 waits for a registration instruction of the WEB top button from the button setting module 404 (step S701).

Next, the button generation module 405 of the WEB browser 400 determines whether the registration instruction of the WEB top button is received from the button setting module 404 (step S702). When the button generation module 405 determines that the registration request is not received, the process is returned to the step S701.

Next, when determining that the registration instruction is received, the button generation module 405 proceeds with the process to step S703, and the communication module 401 of the WEB browser 400 accesses the URL designated. The communication module 401 requests GET from the URL designated, and acquires a response thereto.

Next, the contents analysis module 402 of the WEB browser 400 determines whether the icon position information is included in the WEB contents received as the response (step S704). Specifically, the contents analysis module 402 determines whether there is any statement of "Favicon" described in the step S503 in FIG. 5. When determining that the icon position information is not included (NO in the step S704), the contents analysis modules 402 proceeds with the process to step S711.

Moreover, when determining that the icon position information is included YES in the step S704), the contents analysis module 402 proceeds with the process to step S705 and acquires an icon based on the icon position information. That is, the communication module 401 transmits an icon acquisition request to the URL designated by the icon position information, and acquires an icon as a response thereto. Next, the button generation module 405 of the WEB browser 400 saves the icons acquired in the HDD 204, and saves the position information about the saved icons in the address data module 406. At this time, the button generation module 405 also saves the information showing the icon sizes in relation to the position information.

Next, the communication module 401 determines whether all the icons indicated have been acquired based on the icon position information (step S706). When determining that all the icons have not been acquired (NO in the step S706), the communication module 401 returns the process to the step S705, and acquires and saves icons. The processing routine is repeated until determining that all the icons will be acquired in the step S706. When determining that all the icons have been acquired (YES in the step S706), the communication module 401 proceeds with the process to step S707.

Next, the button generation module 405 requests to register a button to the button registration module 413 of the window manager 410 based on the button registration request in the step S702. When receiving the button registration request, the button registration module 413 generates an ID of the button, and registers the button that received the request.

The button rendering module 412 of the window manager 410 compares the icon sizes acquired in the step S705 and the display size set by the display setting module 416 (step S708). Specifically, the button rendering module 412 compares the information showing the icon sizes, such as "S" and "M", which are indicated in "Favicon" and the set value for display size, such as "S" or "M", which is stored in the RAM 203. When determining that there is an icon whose size is identical to the set display size (YES in the step S708), the button rendering module 412 proceeds with the process to step S709.

Next, the button registration module 413 of the window manager 410 registers the button, and the button rendering module 412 displays the icon in the display size determined in the step S707 on the operation unit 209 (step S709). In this case, the button registration module 413 generates the ID of the registered button.

Next, when determining that there is no icon in the set display size (NO in the step S708), the button rendering module 412 proceeds with the process to step S710. Then, the button registration module 413 of the window manager 410 registers the button. Moreover, the button rendering module 412 displays the icon that is usually displayed for the WEB browser application (the icon in a default size) on the operation unit 209 (step S710). In this case, the button registration module 413 generates the ID of the registered button.

Next, the button registration module 413 of the window manager 410 notifies the registration ID generated in the step S709 or S710 to the button generation module 405 of the WEB browser 400 (step S711). Next, the button generation module 405 saves the registration ID of the button received from the button registration module 413 together with the access URL of the external service 421 in the address data module 406.

Figure 8:
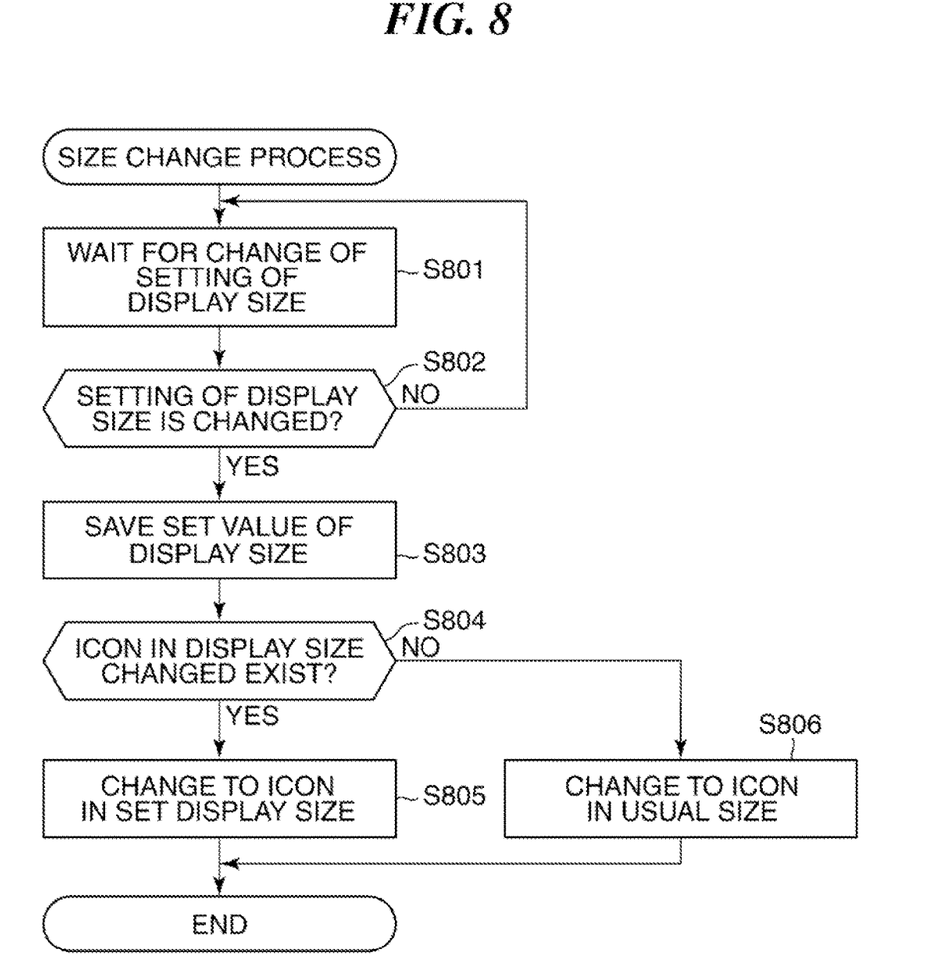
FIG. 8 is a flowchart showing a top button's size change process executed by the image processing system according to the embodiment.

Next, the operation to change a display size of a WEB top button in this system will be described with reference to the flowchart of a top button's size change process shown in FIG. 8. Each operation in the top button's size change process shown in FIG. 8 is achieved by executing a control program by the CPU 201 in the image processing apparatus 100.

The top button's size change process starts by turning on the power of the image processing apparatus 100. When the top button's size change process starts, the display setting module 416 of the window manager 410 waits until a display size of a button is changed (step S801).

Next, the display setting module 416 determines whether the display size of the button has been changed (step S802). When determining that the display size has not been changed (NO in the step S802), the display setting module 416 returns the process to the step S801. Moreover, when determining that the display size has been changed (YES in the step S802), the display setting module 416 proceeds with the process to step S803, and saves the set value of the display size in the RAM 203. The display setting section 416 saves "M" as the set value of the display size in the RAM 203 (step S803), when the display size is changed to "M", for example.

Next, the button rendering module 412 of the window manager 410 determines whether an icon in the display size changed in the step S802 exists (step S804). Specifically, the button rendering module 412 of the window manager 410 compares the set value of the display size saved in the step S803 and the icon size saved in the address data module 406, and determines whether there is a common size value between them. When determining that there is a common size value (YES in the step S804), the button rendering module 412 proceeds with the process to step S805.

Next, the button rendering module 412 of the window manager 410 acquires the icon of the display size determined in the step S804 from the address data module 406, and displays it on the operation unit 209 (step S805). Then, the top button's size change process is finished.

Moreover, when determining that there is not a common size value (NO in the step S804), the button rendering module 412 proceeds with the process to step S806, and displays the icon that is usually displayed for the WEB browser application on the operation unit 209. Then, size-change processing of this top button is finished.

Next, examples of operation screens displayed on the operation unit 209 when the display size of buttons is changed will be described with reference to FIG. 9A, FIG. 9B, and FIG. 9C.

The illustrated operation screens are generated by the button rendering module 412 of the window manager 410 or the screen rendering module 403 of the WEB browser 400. The generated screens are displayed on the operation unit 209 through the operation I/F 205 by a screen change control of the screen rendering control module 411.

Figure 9A:
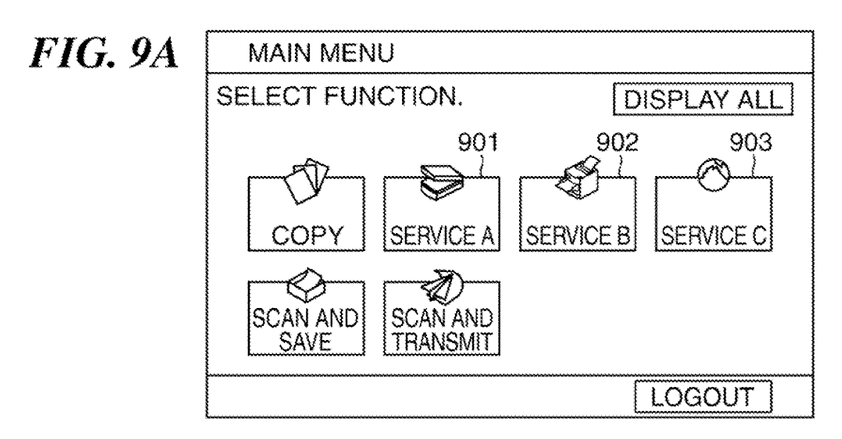
FIG. 9A, FIG. 9B, and FIG. 9C are schematic views showing screens displayed on the display unit of the image processing apparatus according to the embodiment, respectively.

WEB top buttons 901, 902, and 903, which are displayed in the M size as the usual display size, shown in FIG. 9A are assigned to an external service A, an external service B, and an external service C, respectively. Here, since the address data module 406 has the original icons in the M size for the external service A and the external service B, the original icons corresponding to the respective external services are displayed. Moreover, since the address data module 406 does not have an original icon in the M size for the external service C, a default icon that is usually displayed for a WEB browser application is displayed as an icon for the external service C as shown by the button 903.

Figure 9B:
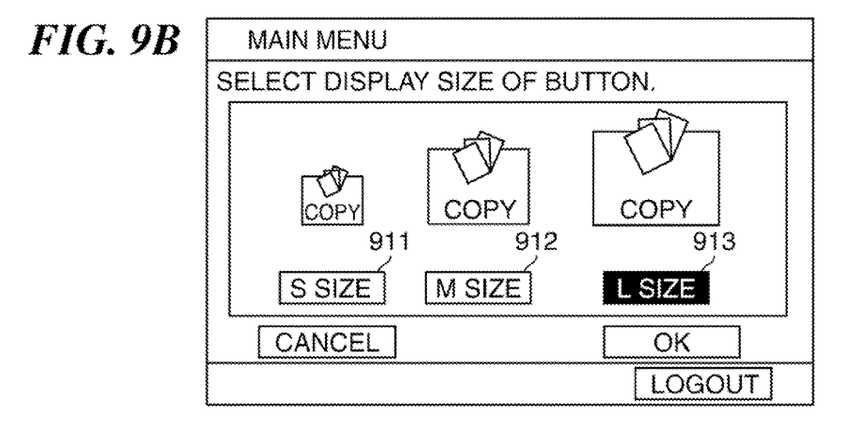

In the operation screen for making a user select the display size of a button illustrated in FIG. 9B, buttons 911, 912, and 913 are used to change the display size of a button into the S size, the M size, and the L size, respectively. For example, when the button 903 is selected, the display size of a button will be changed into the L size.

Figure 9C:
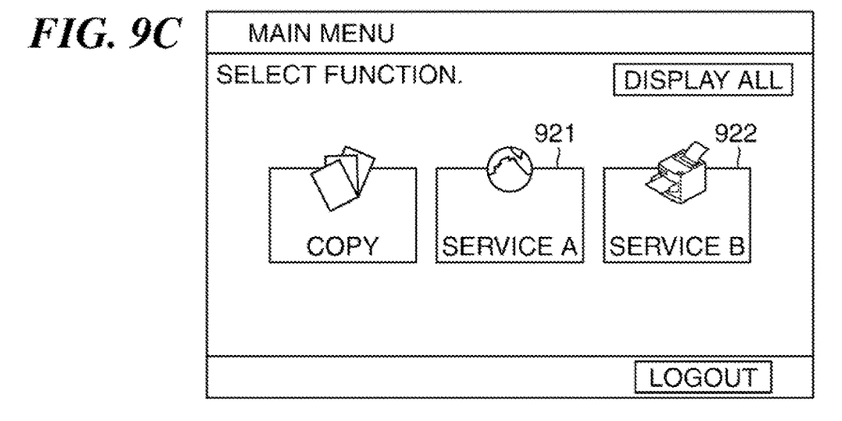

WEB top buttons 921 and 922, which are displayed when the display size is changed to the L size, shown in FIG. 9C are assigned to the external service A and the external service B, respectively. Moreover, since the address data module 406 does not have an original icon in the L size for the external service A, a default icon for a WEB browser application is displayed as an icon for the external service A as shown by the button 921. Since the address data module 406 has the original icon in the L size for the external service B, the original icon corresponding to the external service B is displayed. Thereby, the display size of the WEB top buttons can be changed without deteriorating the quality of appearance.

Although the embodiment describes the mechanism that displays the default icon for the WEB browser application when the icon in the display size does not exist, the original icon in the different size may be displayed instead. For example, when the display size is the M size and only the icon in the S size exists, the icon in the S size may be displayed on the operation unit 209. Moreover, the embodiment enables to display an icon in a different size by enlarging or reducing. Furthermore, the embodiment may allow a user to select a display method from among these display methods.

According to the embodiment configured as above, icons of a plurality of sizes can be acquired from the WEB server, and a WEB top button can be displayed using the icon of the suitable display size. Thereby, the display size of the WEB top button can be changed without deteriorating the quality of appearance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-190621, filed on Sep. 1, 2011, which is hereby incorporated by reference herein in its entirety.

What is claimed is:

1. An image forming apparatus comprising:
a scanner;
a printer;
a display device; and
at least one processor,
wherein the at least one processor acts as:
an obtaining unit configured to obtain a plurality of icons of different sizes from a Web server identified by a URL;
a display control unit configured to perform control to display a plurality of display items, including a display item used for executing a scanning function provided by the scanner in the image forming apparatus, a display item used for executing a copy function provided by the printer in the image forming apparatus, and a display item used for accessing a Web service provided by the Web server by using a Web browser application of the image forming apparatus, on an operation screen of the display device based on a display size set through a user operation, wherein each of the plurality of display items includes at least a display image based on an icon; and an accepting unit configured to accept, through the user operation, an instruction of changing the display size of the plurality of display items, wherein, in a case where the accepting unit accepts the instruction of changing the display size of the plurality of display items, the display control unit is configured to perform control to display on the operation screen the plurality of display items with the changed display size, by:

selecting an icon from among the plurality of icons obtained by the obtaining unit based on the changed display size and performing an arrangement process of displaying the plurality of display items including a display image based on the selected icon as the display item used for accessing the Web service provided by the Web server, and selecting an icon for an application in the image forming apparatus corresponding to the changed display size and performing an arrangement process of displaying the plurality of display items including a display image based on the selected icon as the display item used for executing the scanning function provided by the scanner in the image forming apparatus or the display item used for executing the copy function provided by the printer in the image forming apparatus.

2. The image forming apparatus according to claim 1, wherein in a case where the accepting unit accepts the instruction of changing the display size of the plurality of display items, the display control unit is configured to, when none of the plurality of icons obtained by the obtaining unit corresponds to the display size, select an icon for the Web browser application corresponding to the changed display size and perform an arrangement process of displaying the display item including a display image based on the selected icon, as the display item used for accessing the Web service provide by the Web server.

3. The image forming apparatus according to claim 2, wherein in a case where the accepting unit accepts the instruction of changing the display size of the plurality of display items, the display control unit is configured to, when an icon, a size of which matches with the changed display size, is included in the plurality of icons obtained by the obtaining unit, select the icon, a size of which matches with the changed display size, and perform an arrangement process of displaying the plurality of display items, including a display image based on the selected icon, as the display item used for accessing the Web service provided by the Web server.

4. The image forming apparatus according to claim 1, wherein the display control unit is further configured to, in a case where the accepting unit accepts an instruction of selecting, through the user operation, the display item used for accessing the Web service displayed on the operation screen, perform control to obtain Web contents of the URL associated with the display item using the Web browser application and display the obtained Web contents on the display device.

5. The image forming apparatus according to claim 1, wherein the obtaining unit is configured to obtain the plurality of icons when receiving an instruction of registering the display item to which the URL is assigned.

6. The image forming apparatus according to claim 1, wherein the obtaining unit is configured to obtain the plurality of icons when an HTML file acquired by accessing the server includes information showing a storage location of the icons concerned.

7. A control method for an image forming apparatus including a scanner, a printer, and a display device, the method comprising:

obtaining a plurality of icons of different sizes from a Web server identified by a URL;

displaying a plurality of display items, including a display item used for executing a scanning function provided by the scanner in the image forming apparatus, a display item used for executing a copy function provided by the printer in the image forming apparatus, and a display item used for accessing a Web service provided by the Web server by using a Web browser application of the image forming apparatus, on an operation screen of the display device based on a display size set through a user operation, each of the plurality of display items including at least a display image based on an icon; and accepting, through the user operation, an instruction of changing the display size of the plurality of display items, wherein, in a case where the instruction of changing the display size of the plurality of display items is accepted, the plurality of display items are displayed on the operation screen with the changed display size by:

selecting an icon from among the obtained plurality of icons based on the changed display size and performing an arrangement process of displaying the plurality of display items including a display image based on the selected icon as the display item used for accessing the Web service provided by the Web server, and selecting an icon for an application in the image forming apparatus corresponding to the changed display size and performing an arrangement process of displaying the plurality of display items including a display image based on the selected icon as the display item used for executing the scanning function provided by the scanner in the image forming apparatus or the display item used for executing the copy function provided by the printer in the image forming apparatus.

8. A non-transitory computer-readable storage medium storing a control program causing a computer to execute a control method for an image forming apparatus including a scanner, a printer, and a display device, the control method comprising:

obtaining a plurality of icons of different sizes from a Web server identified by a URL;

displaying a plurality of display items, including a display item used for executing a function provided by the scanner in the image forming apparatus, a display item used for executing a copy function provided by the printer in the image forming apparatus, and a display item used for accessing a Web service provided by the Web server by using a Web browser application of the image forming apparatus, on an operation screen of the display device based on a display size set through a user operation, each of the plurality of display items including at least a display image based on an icon; and accepting, through the user operation, an instruction of changing the display size of the plurality of display items, wherein, in a case where the instruction of changing the display size of the plurality of display items is accepted, the plurality of display items are displayed on the operation screen with the changed display size by:

selecting an icon from among the obtained plurality of icons based on the changed display size and performing an arrangement process of displaying the plurality of display items including a display image based on the selected icon as the display item used for accessing the Web service provided by the Web server, and selecting an icon for an application in the image forming apparatus corresponding to the changed display size and performing an arrangement process of displaying the plurality of display items including a display image based on the selected icon as the display item used for executing the scanning function provided by the scanner in the image forming apparatus or the display item used for executing the copy function provided by the printer in the image forming apparatus.

9. The image forming apparatus according to claim 1, further comprising a storage device, wherein the at least one processor further acts as:

a saving unit configured to save the plurality of icons with different sizes obtained by the obtaining unit, in association with the URL.

10. The image forming apparatus according to claim 1, further comprising a storage device, wherein each of the plurality of the display items displayed on the operation screen comprises a button including at least a display image based on an icon and a name of the function.

* * * * *